US008702497B2

(12) United States Patent
Chudek et al.

(10) Patent No.: US 8,702,497 B2
(45) Date of Patent: Apr. 22, 2014

(54) VIDEO POKER TERMINAL WITH IMPROVED BUTTON PANEL

(75) Inventors: Christopher W. Chudek, Evanston, IL (US); Paul M. Lesley, Blue Island, IL (US)

(73) Assignee: WMS Gaming Inc., Waukegan, IL (US)

( * ) Notice: Subject to any disclaimer, the term of this patent is extended or adjusted under 35 U.S.C. 154(b) by 1192 days.

(21) Appl. No.: 12/619,113

(22) Filed: Nov. 16, 2009

(65) Prior Publication Data

US 2010/0124962 A1 May 20, 2010

Related U.S. Application Data

(60) Provisional application No. 61/114,719, filed on Nov. 14, 2008.

(51) Int. Cl.
*A63F 9/24* (2006.01)
*A63F 13/00* (2006.01)

(52) U.S. Cl.
USPC .................... 463/20; 463/11; 463/13; 463/16

(58) Field of Classification Search
USPC .......................................... 463/11, 13, 16, 20
See application file for complete search history.

(56) References Cited

U.S. PATENT DOCUMENTS

| | | | | |
|---|---|---|---|---|
| 2,661,954 | A | 12/1953 | Koci | 463/57 |
| D236,720 | S | 9/1975 | Baker | D21/370 |
| 4,046,419 | A | 9/1977 | Schmitt | 297/153 |
| D264,485 | S | 5/1982 | Kitchen | D21/370 |
| 4,705,274 | A | 11/1987 | Lubeck | 273/148 |
| 4,743,022 | A | 5/1988 | Wood | 273/85 |
| 4,840,343 | A | 6/1989 | Gasser | 248/500 |
| 4,960,117 | A | 10/1990 | Moncrief et al. | 463/46 |
| D315,110 | S | 3/1991 | Slater | D10/88 |
| 5,015,189 | A | 5/1991 | Wenzinger et al. | 434/63 |
| 5,083,738 | A | 1/1992 | Infanti | 248/500 |

(Continued)

FOREIGN PATENT DOCUMENTS

| | | | |
|---|---|---|---|
| EP | 649 671 A1 | 4/1995 | A63F 7/02 |
| JP | 03210172 B2 | 2/1993 | A63F 9/22 |
| WO | WO 97/27570 | 7/1997 | G07F 17/34 |

OTHER PUBLICATIONS

Product Sheet for “American Eagle”, Eagle Co. Ltd., 2 pages, (1997).

(Continued)

*Primary Examiner* — William Brewster
*Assistant Examiner* — Ryan Hsu
(74) *Attorney, Agent, or Firm* — Nixon Peabody LLP

(57) ABSTRACT

The present invention is a video poker terminal comprising a housing, first mechanical buttons, and second mechanical buttons. The housing has a horizontal plane that is generally parallel to a floor. The first mechanical buttons are generally located on a plane that intersects the horizontal plane at a first angle α that is in a range from approximately 10° to 45°. Each of the first buttons produces an output signal in response to a predetermined movement of the button, and includes a variable display for displaying a card. The second mechanical buttons are located below the first mechanical buttons. Each of the second mechanical buttons is located on a plane that intersects the horizontal plane at a second angle β that is less than the first angle α. The first mechanical buttons rotate around a pivotable axis that is located on their ends opposite of the second mechanical buttons.

19 Claims, 9 Drawing Sheets

(56) References Cited

U.S. PATENT DOCUMENTS

| | | | | |
|---|---|---|---|---|
| 5,102,192 | A | 4/1992 | Barile | 297/257 |
| 5,114,112 | A | 5/1992 | Infanti | 248/500 |
| 5,143,055 | A | 9/1992 | Eakin | 601/47 |
| D333,164 | S | 2/1993 | Kraft et al. | D21/325 |
| 5,195,746 | A | 3/1993 | Boyd et al. | 463/37 |
| 5,232,191 | A | 8/1993 | Infanti | 248/500 |
| 5,290,034 | A | 3/1994 | Hineman | 273/148 |
| 5,294,120 | A | 3/1994 | Schultz | 273/85 |
| 5,308,065 | A | 5/1994 | Bridgeman et al. | 273/85 |
| 5,322,295 | A | 6/1994 | Cabot et al. | 273/292 |
| D351,869 | S | 10/1994 | Rothschild et al. | D21/37 |
| 5,401,023 | A | 3/1995 | Wood | 273/85 |
| 5,409,296 | A | 4/1995 | Barlie | 297/344.1 |
| 5,411,257 | A | 5/1995 | Fulton | 273/85 |
| 5,431,408 | A | 7/1995 | Adams | 273/306 |
| 5,437,451 | A | 8/1995 | Fulton | 273/138 |
| 5,437,453 | A | 8/1995 | Hineman | 273/148 |
| 5,472,197 | A | 12/1995 | Gwiasda et al. | 273/143 R |
| 5,489,101 | A | 2/1996 | Moody | 273/292 |
| 5,511,781 | A | 4/1996 | Wood et al. | 273/85 |
| 5,522,641 | A | 6/1996 | Infanti | 297/344.13 |
| 5,531,448 | A | 7/1996 | Moody | 273/292 |
| 5,542,748 | A | 8/1996 | Barlie | 297/463.1 |
| D376,391 | S | 12/1996 | Okumura | D21/326 |
| D380,014 | S | 6/1997 | Yang | D21/370 |
| 5,655,961 | A | 8/1997 | Acres et al. | 463/27 |
| 5,669,818 | A | 9/1997 | Thorner et al. | 463/30 |
| 5,678,886 | A | 10/1997 | Infanti | 297/217.3 |
| 5,732,950 | A | 3/1998 | Moody | 273/292 |
| 5,762,617 | A | 6/1998 | Infanti | 601/49 |
| 5,791,731 | A | 8/1998 | Infanti | 297/217.3 |
| 5,816,916 | A | 10/1998 | Moody | 463/13 |
| 5,820,460 | A | 10/1998 | Fulton | 463/13 |
| 5,823,873 | A | 10/1998 | Moody | 463/13 |
| 5,868,619 | A | 2/1999 | Wood et al. | 463/13 |
| 5,882,259 | A | 3/1999 | Holmes, Jr. | 463/13 |
| D407,759 | S | 4/1999 | Isetani et al. | D21/326 |
| 5,954,335 | A | 9/1999 | Moody | 273/292 |
| 5,957,774 | A | 9/1999 | Holmes, Jr. et al. | 463/13 |
| 5,976,016 | A | 11/1999 | Moody et al. | 463/13 |
| 5,984,782 | A | 11/1999 | Inoue | 463/20 |
| 6,007,066 | A | 12/1999 | Moody | 273/292 |
| D419,201 | S | 1/2000 | De Haas | D21/370 |
| D419,606 | S | 1/2000 | Toriyama | D21/325 |
| 6,012,720 | A | 1/2000 | Webb | 273/292 |
| 6,045,129 | A | 4/2000 | Cooper et al. | 273/292 |
| 6,047,963 | A | 4/2000 | Pierce et al. | 273/143 R |
| D424,122 | S | 5/2000 | Dickenson et al. | D21/325 |
| D428,062 | S | 7/2000 | Hayashi | D21/325 |
| 6,089,663 | A | 7/2000 | Hill | 297/258.1 |
| 6,098,985 | A | 8/2000 | Moody | 273/292 |
| 6,102,394 | A | 8/2000 | Wurz et al. | 273/138.2 |
| 6,110,040 | A | 8/2000 | Sanduski et al. | 463/13 |
| 6,110,043 | A | 8/2000 | Olsen | 463/27 |
| 6,117,010 | A | 9/2000 | Cantebury | 463/20 |
| 6,120,378 | A | 9/2000 | Moody et al. | 463/20 |
| 6,129,355 | A | 10/2000 | Hahn et al. | 273/142 R |
| 6,132,311 | A | 10/2000 | Williams | 463/13 |
| 6,135,562 | A | 10/2000 | Infanti | 297/440.2 |
| 6,149,521 | A | 11/2000 | Sanduski | 463/13 |
| 6,155,925 | A | 12/2000 | Giobbi et al. | 463/20 |
| 6,159,098 | A | 12/2000 | Slomiany et al. | 463/25 |
| 6,206,780 | B1 | 3/2001 | Awada | 463/13 |
| D439,931 | S | 4/2001 | Yamaguchi | D21/369 |
| 6,210,279 | B1 | 4/2001 | Dickinson | 463/37 |
| 6,217,448 | B1 | 4/2001 | Olsen | 463/25 |
| 6,227,614 | B1 | 5/2001 | Rubin | 297/172 |
| 6,227,970 | B1 | 5/2001 | Shimizu et al. | 463/20 |
| D443,313 | S | 6/2001 | Brettschneider | D21/369 |
| 6,248,016 | B1 | 6/2001 | Walker et al. | 463/13 |
| 6,257,979 | B1 | 7/2001 | Walker et al. | 463/13 |
| D446,252 | S | 8/2001 | Yamaguchi | D21/325 |
| 6,283,546 | B1 | 9/2001 | Hill | 297/271.1 |
| 6,290,229 | B1 | 9/2001 | Perez | 273/148 |
| D450,094 | S | 11/2001 | Hedrick et al. | D21/369 |
| 6,334,612 | B1 * | 1/2002 | Wurz et al. | 273/143 R |
| 6,336,860 | B1 | 1/2002 | Webb | 463/22 |
| 6,354,660 | B1 | 3/2002 | Friedrich | 297/217.1 |
| 6,375,567 | B1 | 4/2002 | Acres | 463/25 |
| D459,402 | S | 6/2002 | Wurz et al. | D21/325 |
| 6,416,407 | B1 | 7/2002 | Carrico et al. | 463/13 |
| 6,416,408 | B2 | 7/2002 | Tracy et al. | 463/16 |
| 6,422,670 | B1 | 7/2002 | Hedrick et al. | 312/223.1 |
| 6,422,941 | B1 | 7/2002 | Thorner et al. | 463/30 |
| D463,504 | S | 9/2002 | Stephan | D21/325 |
| D464,377 | S | 10/2002 | Wurz et al. | D21/325 |
| 6,461,240 | B1 | 10/2002 | Perkins | 463/13 |
| 6,471,587 | B1 | 10/2002 | Wood et al. | 463/13 |
| D466,160 | S | 11/2002 | Hirato et al. | D21/325 |
| 6,474,645 | B2 | 11/2002 | Tarantino | 273/274 |
| D467,977 | S | 12/2002 | Gatto et al. | D21/326 |
| 6,494,454 | B2 | 12/2002 | Adams | 273/292 |
| D468,364 | S | 1/2003 | Beadell et al. | D21/325 |
| 6,530,842 | B1 | 3/2003 | Wells et al. | 463/46 |
| 6,530,872 | B2 | 3/2003 | Freshland et al. | 494/49 |
| 6,561,898 | B2 | 5/2003 | Moody | 463/13 |
| 6,569,013 | B1 | 5/2003 | Taylor | 463/13 |
| 6,569,014 | B2 | 5/2003 | Walker et al. | 463/13 |
| 6,572,187 | B2 | 6/2003 | Laufer | 297/217.1 |
| 6,589,114 | B2 | 7/2003 | Bradley | 463/20 |
| 6,595,520 | B1 | 7/2003 | Richards et al. | 273/292 |
| 6,595,852 | B2 | 7/2003 | Wang | 463/13 |
| 6,609,972 | B2 | 8/2003 | Seelig | 463/20 |
| 6,612,926 | B1 | 9/2003 | Dabrowski | 463/13 |
| 6,612,927 | B1 | 9/2003 | Slomiany et al. | 463/16 |
| 6,616,142 | B2 | 9/2003 | Adams | 273/292 |
| 6,637,747 | B1 | 10/2003 | Garrod | 273/292 |
| D483,075 | S | 12/2003 | Kang | D21/326 |
| 6,672,958 | B2 | 1/2004 | Bennett | 463/13 |
| 6,708,975 | B1 | 3/2004 | Fox et al. | 273/292 |
| 6,715,756 | B2 | 4/2004 | Inoue | 273/138 |
| 6,726,427 | B2 | 4/2004 | Jarvis et al. | 413/12 |
| D493,843 | S | 8/2004 | Jackson et al. | D21/327 |
| 6,780,106 | B2 | 8/2004 | DeMar et al. | 463/16 |
| D495,754 | S | 9/2004 | Wurz et al. | D21/370 |
| D495,755 | S | 9/2004 | Wurz et al. | D21/370 |
| D500,098 | S | 12/2004 | Doi | D21/477 |
| 6,857,957 | B2 | 2/2005 | Marks et al. | 463/13 |
| D508,268 | S | 8/2005 | Hanchar et al. | D21/369 |
| D508,269 | S | 8/2005 | Wichinsky | D21/369 |
| D508,719 | S | 8/2005 | de Haas | D21/369 |
| D508,961 | S | 8/2005 | Gatto et al. | D21/369 |
| D509,254 | S | 9/2005 | Rasmussen et al. | D21/369 |
| D512,105 | S | 11/2005 | Chitrapongse et al. | D21/370 |
| 7,184,277 | B2 | 2/2007 | Beirne | 361/807 |
| D539,854 | S | 4/2007 | Luciano et al. | D21/369 |
| D564,600 | S | 3/2008 | Greenberg et al. | D21/370 |
| D564,601 | S | 3/2008 | Strahinic et al. | D21/370 |
| D566,197 | S | 4/2008 | Greenberg et al. | D21/370 |
| 7,503,849 | B2 | 3/2009 | Hornik et al. | 463/20 |
| 7,775,881 | B2 * | 8/2010 | Griswold et al. | 463/31 |
| 7,914,378 | B2 * | 3/2011 | Mattice et al. | 463/37 |
| 8,070,609 | B2 * | 12/2011 | Waxman et al. | 463/46 |
| 8,177,637 | B2 * | 5/2012 | Beadell et al. | 463/31 |
| 2002/0034974 | A1 | 3/2002 | Wood et al. | 463/13 |
| 2002/0041069 | A1 | 4/2002 | Steelman | 273/138.1 |
| 2002/0169015 | A1 | 11/2002 | Moody | 463/13 |
| 2002/0185816 | A1 | 12/2002 | Moody et al. | 273/292 |
| 2003/0032469 | A1 | 2/2003 | Moody et al. | 463/13 |
| 2003/0038425 | A1 | 2/2003 | Tarantino | 273/274 |
| 2003/0064773 | A1 | 4/2003 | Baerlocher et al. | 463/16 |
| 2003/0119572 | A1 | 6/2003 | Moody et al. | 463/13 |
| 2003/0122973 | A1 | 7/2003 | Huang | 348/836 |
| 2003/0153377 | A1 | 8/2003 | Lisowski, Sr. | 463/13 |
| 2003/0166411 | A1 | 9/2003 | Moody | 463/13 |
| 2003/0181232 | A1 | 9/2003 | Peccola, Jr. | 463/13 |
| 2003/0186733 | A1 | 10/2003 | Wolf et al. | 463/16 |
| 2003/0189290 | A1 | 10/2003 | Moody | 273/292 |
| 2003/0214097 | A1 | 11/2003 | Moody | 273/292 |
| 2004/0043807 | A1 | 3/2004 | Pennington | 463/13 |
| 2004/0053662 | A1 | 3/2004 | Pacey | 463/16 |
| 2004/0132524 | A1 | 7/2004 | Ramstad et al. | 463/16 |

(56) References Cited

U.S. PATENT DOCUMENTS

| | | | | |
|---|---|---|---|---|
| 2004/0248641 | A1 | 12/2004 | Jarvis et al. | 463/20 |
| 2005/0014547 | A1 | 1/2005 | Gomez et al. | 463/16 |
| 2006/0079316 | A1 | 4/2006 | Flemming et al. | 463/25 |

OTHER PUBLICATIONS

Product Sheet for “Monopoly Chairman of the Board™”, WMS Gaming Inc. 2 pages (1999).

Product Sheet for “American Eagle”, Eagle Co., Ltd., 2 pages (2000).

Product Sheet for “Survivor”, WMS Gaming Inc., 4 pages, (2001).

Product Sheet for “ProSLOT® 6000”, Bally Gaming Systems, 4 pages, (2002).

Product Sheet for “EVO™ Hybrid”, Bally Gaming Systems, 4 pages, (2002).

Product Sheet for “3RV™”, WMS Gaming Inc., 2 pages, (2002 or earlier).

Product Sheet for “Miss America”, AC Coin & Slot, 2 pages (2002 or earlier).

Draw Poker Variants, www.pokernews.info/poker-variants/drawpoker.html, 6 pages (2005 or earlier).

* cited by examiner

VIDEO POKER TERMINAL WITH IMPROVED BUTTON PANEL

CROSS REFERENCE TO RELATED APPLICATION

This application is related to and claims priority to U.S. Provisional Application No. 61/114,719 filed Nov. 14, 2008, titled "Video Poker Terminal With Improved Button Panel," which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a video poker terminal having button panels in which variable displays are located for displaying the cards to the player.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Where the available gaming options include a number of competing machines and the expectation of winning at each machine is roughly the same (or believed to be the same), players are likely to be attracted to the most entertaining and exciting machines. Operators consequently strive to employ the most entertaining and exciting machines, features, and enhancements available because such machines attract frequent play and hence increase profitability to the operator.

The use of video with gaming terminals has increased the entertainment value for many wagering games. With regard to video poker terminals, many players prefer a game that has more of a look and a feel of the traditional poker game in which individual cards are dealt and individually displayed. Furthermore, because of the number of player inputs (e.g., deal, draw, hold, wager amounts, etc.), providing an ergonomically positioned set of mechanical buttons enhances the gaming experience and the speed of play, which operators prefer because it increases the total coin input to the video poker terminal. The present invention addresses these needs.

SUMMARY OF THE INVENTION

The present invention relates to a video poker terminal for conducting a poker game comprising a housing, a first plurality of mechanical buttons, and a second plurality of mechanical buttons. The housing has a horizontal plane that is generally parallel to a floor on which the video poker terminal resides. The first plurality of mechanical buttons are generally located on a plane that intersects the horizontal plane at a first angle α that is in a range from approximately 10° to 45°. Each button produces an output signal in response to a predetermined movement of the button. Each button includes a variable display for displaying a card. The cards form a poker hand. The second plurality of mechanical buttons are below the first plurality of mechanical buttons. Each of the second plurality of mechanical buttons is located on a plane that intersects the horizontal plane at a second angle β that is less than the first angle α. The second plurality of mechanical buttons include a wager button and a card-dealing button. The second plurality of mechanical buttons produces a wager output signal and a card-dealing output signal in response to a predetermined movement of the wager button and the card-dealing button, respectively.

The present invention also includes a method for conducting a draw poker game on a gaming terminal having a first plurality of mechanical buttons and a second plurality of mechanical buttons. The second plurality of buttons is proximal to the player's hands and the first plurality of buttons is distal to the player's hands. The method comprises (i) actuating one of the second plurality of buttons with a thumb on a first one of the player's hands to determine a wager amount for the draw poker game, (ii) displaying each card in the initial card hand for the draw poker game on individual variable displays located within respective ones of the first plurality of mechanical buttons, (iii) receiving, from the first plurality of mechanical buttons, player inputs for determining the cards to be held and the cards to be discarded from the initial card hand, wherein the first plurality of mechanical buttons are actuated by the player's fingers, (iv) actuating another one of the second plurality of buttons with a thumb on a second one of the player's hands to deal the replacement cards for the discarded cards from the initial card hand, wherein the replacement cards and the held cards define a final card hand, and (v) providing an award if one of a predetermined set of winning poker hands is achieved in the final card hand.

According to another aspect of the invention, a user-input button for a gaming device comprises a movable member, a pivotable axis, a biasing mechanism, and a variable display. The movable member activates a function associated with the user-input button, usually through a switch. The pivotable axis is located at one end of the movable member. The movable member pivots around the pivotable axis between a normal position and an actuated position. The biasing mechanism urges the movable member toward the normal position. The variable display is located under the movable member for displaying an image associated with the user-input button.

Additional aspects of the invention will be apparent to those of ordinary skill in the art in view of the detailed description of various embodiments, which is made with reference to the drawings, a brief description of which is provided below.

Figure 1:
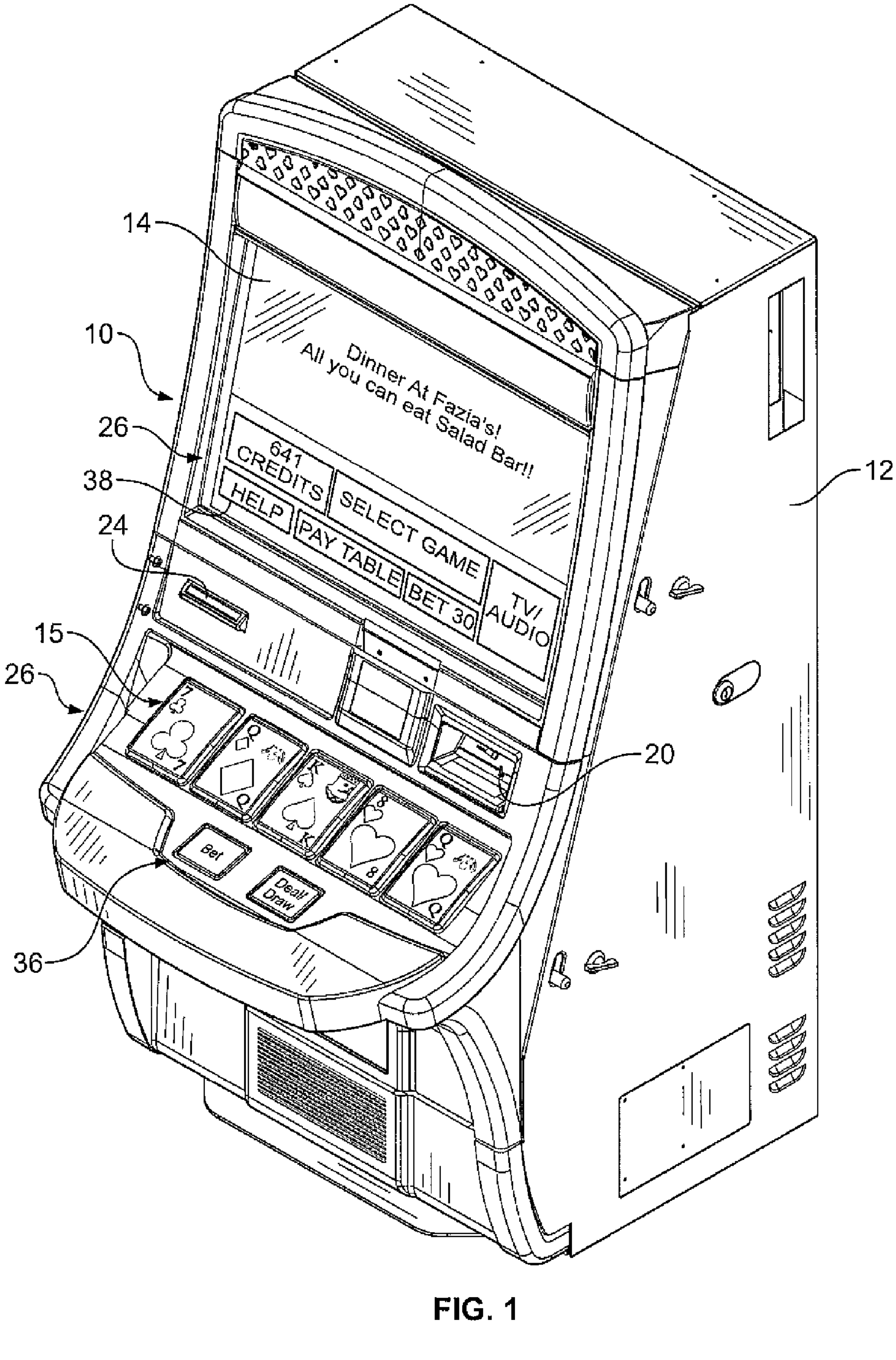
FIG. 1 is a perspective view of a video poker terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. The gaming terminal 10 is configured to play video poker.

The gaming terminal 10 comprises a cabinet or housing 12. For output devices, the gaming terminal 10 may include a primary display area 14, a set of button displays 15 (which will be described in more detail below in FIGS. 3-8), and one or more audio speakers. The primary display area 14 may display information associated with wagering games, non-wagering games, community games, progressives, advertisements, services, premium entertainment, text messaging, emails, alerts or announcements, broadcast information, subscription information, etc. As shown, the primary display area 14 includes a larger advertising section (regarding Fazia's Restaurant), a credit meter section (showing 641 credits), and a wager meter section (showing a 30 credit bet). Additionally, the primary display area 14 includes a TV/Audio entertainment section that allows a player to selectively control various forms of entertainment to be played while he or she plays the poker game. As discussed below, because the poker game is displayed using the button displays 15, the primary display area 14 can be used for a variety of other functions, providing more entertainment functions to the player and selective marketing functions to the casino operator.

For input devices, the gaming terminal 10 may include a bill validator 20, a coin acceptor (not shown), a ticket acceptor (not shown), one or more information readers 24 (e.g., player tracking card reader), one or more player-input devices 26, and one or more player-accessible ports (e.g., an audio output jack for headphones, a video headset jack, a wireless transmitter/receiver, etc.). The player-input devices 26 may include a plurality of mechanical buttons 36 on a button panel and/or a touch screen 38 mounted over the primary display area 14 to create one or more soft touch keys. As shown, one set of five mechanical buttons 36 is positioned over the five button displays 15 (discussed in more detail below), while two other mechanical buttons 36 provide for a BET function and a DEAL/DRAW function. As an example of touch keys, the primary display area 14 in FIG. 1 illustrates a HELP touch key (explaining the game play to the player), a SELECT GAME touch key (allowing the player to select which type of poker game), and a PAY TABLE touch key (allowing the player to view the pay table for the various winning poker hands). The player-input devices 26 may further comprise technologies that do not rely upon touching the gaming terminal, such as speech-recognition technology, gesture-sensing technology, eye-tracking technology, etc.

While these typical components found in the gaming terminal 10 are described below, it should be understood that numerous other peripheral devices and other elements may exist and may be used in any number of combinations to create various forms of a gaming terminal.

Video images in the primary display area 14 and/or the button displays 15 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 50 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

Figure 2:
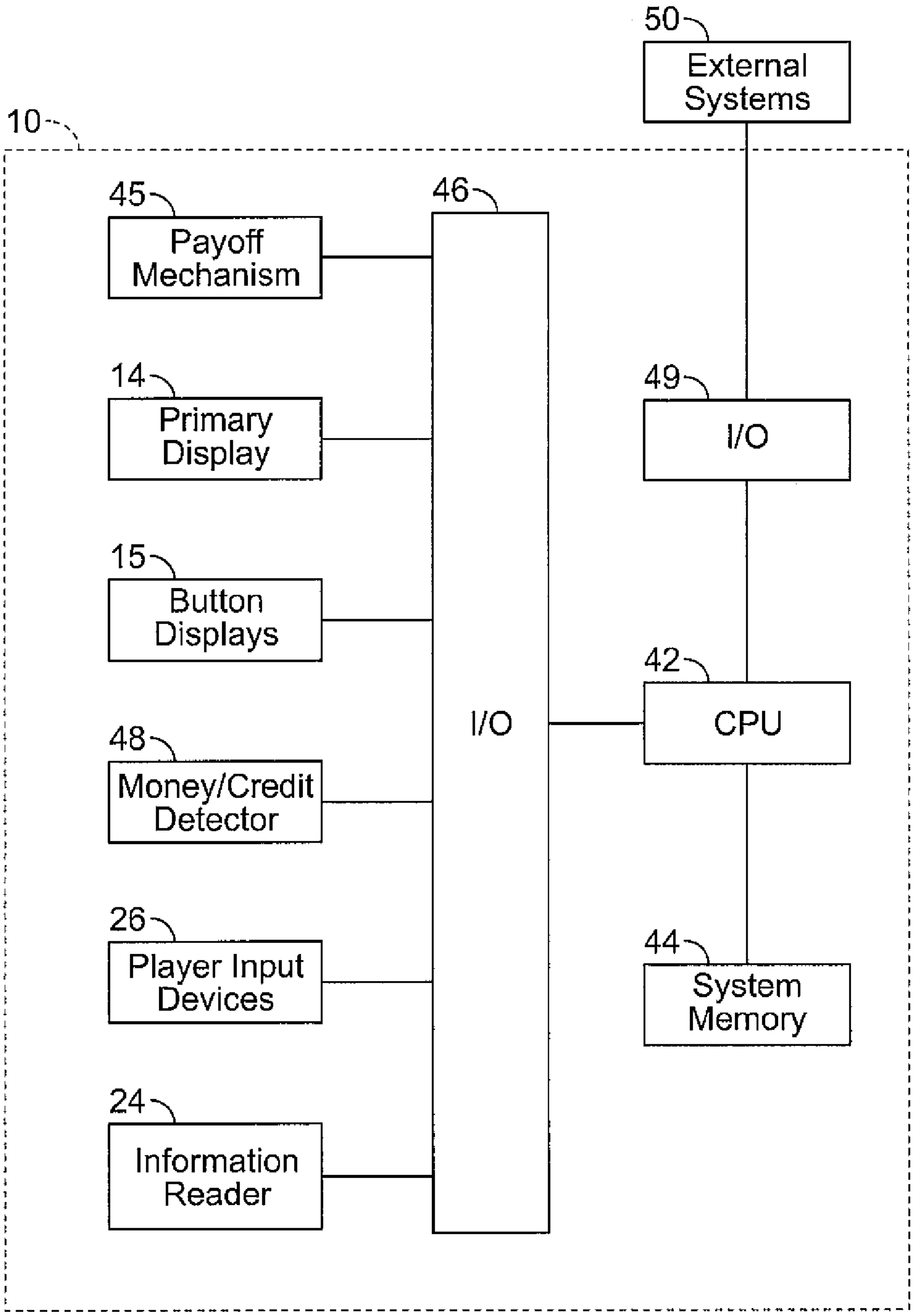
FIG. 2 is a schematic view of the components of the video poker terminal of FIG. 1.

Turning now to FIG. 2, the various components of the gaming terminal 10 are controlled by a central processing unit (CPU) 42, also referred to herein as a controller or processor (such as a microcontroller or microprocessor). The controller 42 is typically coupled to these various internal components of the gaming terminal 10 by an internal I/O circuitry 46. The controller 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 50. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The money/credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the button displays 15, and a payoff mechanism 45. The payoff mechanism 45 is operable in response to instructions from the controller 42 to award a payoff to the player in response to certain winning outcomes that might occur in the base game, the bonus game (s), or via an external game or event. The payoff may be provided in the form of money, redeemable points, services or any combination thereof. Such payoff may be associated with a ticket (from a ticket printer), portable data unit (e.g., a card), coins, currency bills, accounts, and the like. The payoff amounts distributed by the payoff mechanism 45 are determined by one or more pay tables stored in the system memory 44.

Communications between the controller 42 and both the peripheral components of the gaming terminal 10 and the external system 50 occur through input/output (I/O) circuit 49, which can include any suitable bus technologies, such as an AGTL+ frontside bus and a PCI backside bus. Although the I/O circuit 49 is shown as a single block, it should be appreciated that the I/O circuit 49 may include a number of different types of I/O circuits. Furthermore, in some embodiments, the components of the gaming terminal 10 can be interconnected according to any suitable interconnection architecture (e.g., directly connected, hypercube, etc.).

The I/O circuit 49 may be connected to an external system interface, which is connected to the external system 50. The controller 42 communicates with the external system 50 via the external system interface and a communication path (e.g., serial, parallel, IR, RC, 10bT, etc.). The external system 50 may include a gaming network, other gaming terminals, a gaming server, a remote controller, communications hardware, or a variety of other interfaced systems or components.

The controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit and the system memory 44. The controller 42 is operable to execute all of the various gaming methods and other processes disclosed herein.

The gaming terminal 10 may communicate with external system 50 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 50 ("thin client" gaming terminal), or distributed therebetween in any suitable manner ("rich client" gaming terminal). As such, some of the functionality associated with the video poker game may reside outside of the housing 12 of the gaming terminal 10.

Figure 3:
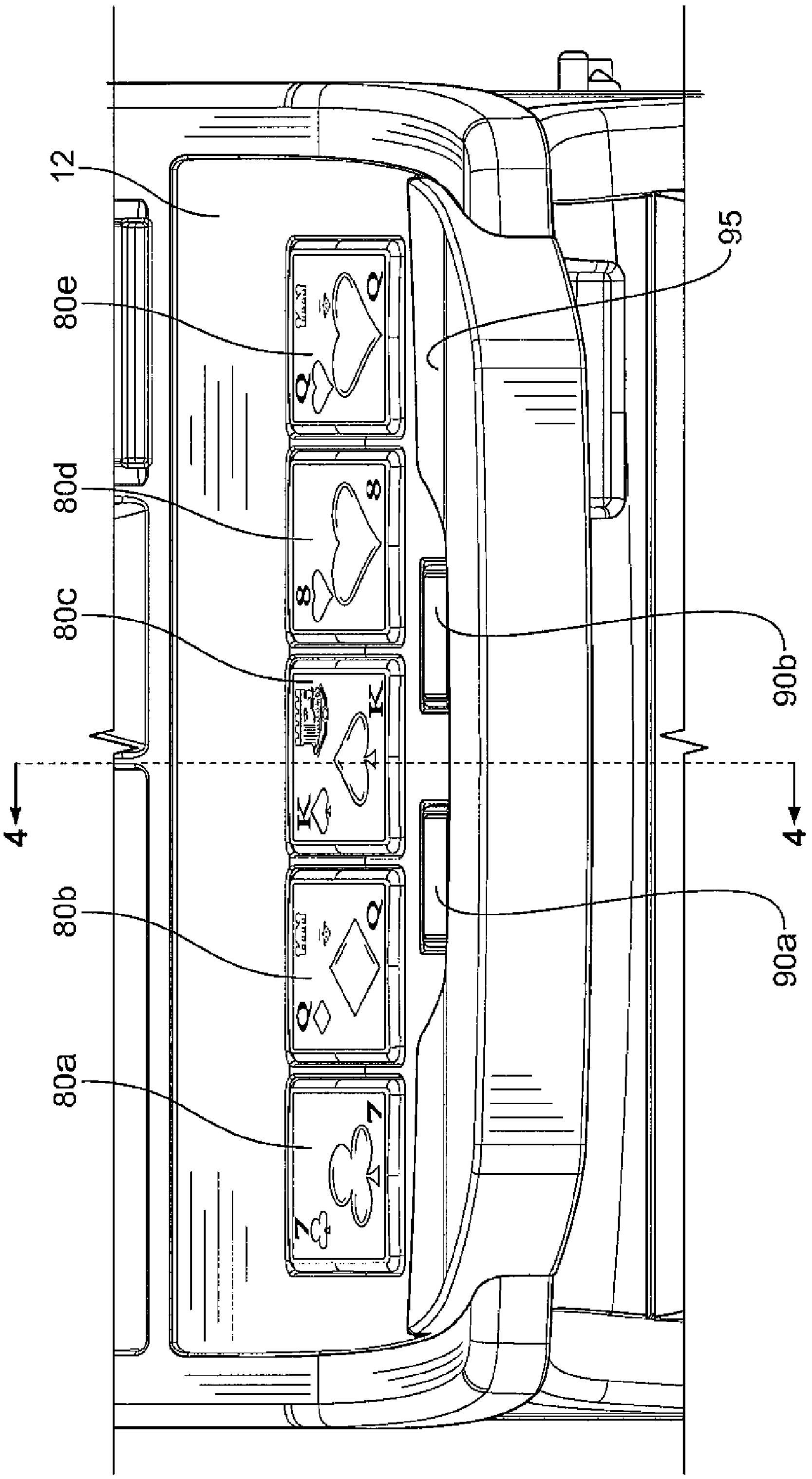
FIG. 3 is a front view of the video poker terminal in the region of the button panel.

FIG. 3 illustrates a front view of the gaming terminal 10 in the region of the button panel, which may include various mechanical buttons 36 to provide player inputs. As shown in FIG. 3, there are five card buttons **80*a*-80*e* that display the poker hand to the player as well as receiving inputs from the player regarding the poker hand. These five card buttons 80*a*-80*e* are variable display buttons in that the variable displays 15 (see FIGS. 4-5) provide for various indicia (e.g., various cards) to be displayed in association with each of the five card buttons 80*a*-80*e*, as described in more detail below. Actuating one of the five card buttons 80*a*-80*e*** after the initial poker hand has been dealt controls whether that particular card will be "held" or "discarded" during the draw of the poker game, as described in more detail below.

Additionally, there are two other game-related buttons **90*a* and 90*b*, which are also useful in playing the poker game. The BET button 90*a* controls the wager input for a player. For example, a poker game may have a minimum bet of one credit and a maximum bet of five credits. Each time the player actuates the BET button 90*a*, the amount of the wager for that poker game increases by one credit until five credits are reached, at which time another actuation resets the wager amount to one credit. The player's desired wager may remain constant (i.e., not requiring any player input) for each successive poker game, until the player decides to alter his or her wager amount on the poker game by actuating the BET button 90*a*. The BET button 90*a* and the DEAL/DRAW button 90*b* are typical mechanical buttons having switches that cause output signals to be received by the controller 42 in response to the player's actuation of the buttons 90. Alternatively, the buttons 90 can be more sophisticated and include variable displays providing various functionalities, like the variable displays 15 located within the card buttons 80**.

The second button, the DEAL/DRAW button **90*b*, serves to instruct the gaming terminal 10 to initially deal the cards and, after the initial card hand is dealt, to draw cards that will replace cards in the initial card hand that the player has chosen to discard. In other words, the DEAL/DRAW button 90*b*** serves two functions, both of which relate to the player receiving cards for his or her poker hand.

The five card buttons **80*a*-80*e*, the BET button 90*a*, and the DEAL/DRAW button 90*b* are easily reached by the player's thumbs and fingers, as described below with regard to FIG. 7. The player's arms and wrists can rest along an armrest 95 that extends outwardly at an angle from the housing 12 of the gaming terminal 10. The armrest 95 partially encompasses the BET button 90***a* and the DEAL/DRAW button 90*b*.

Figure 4:
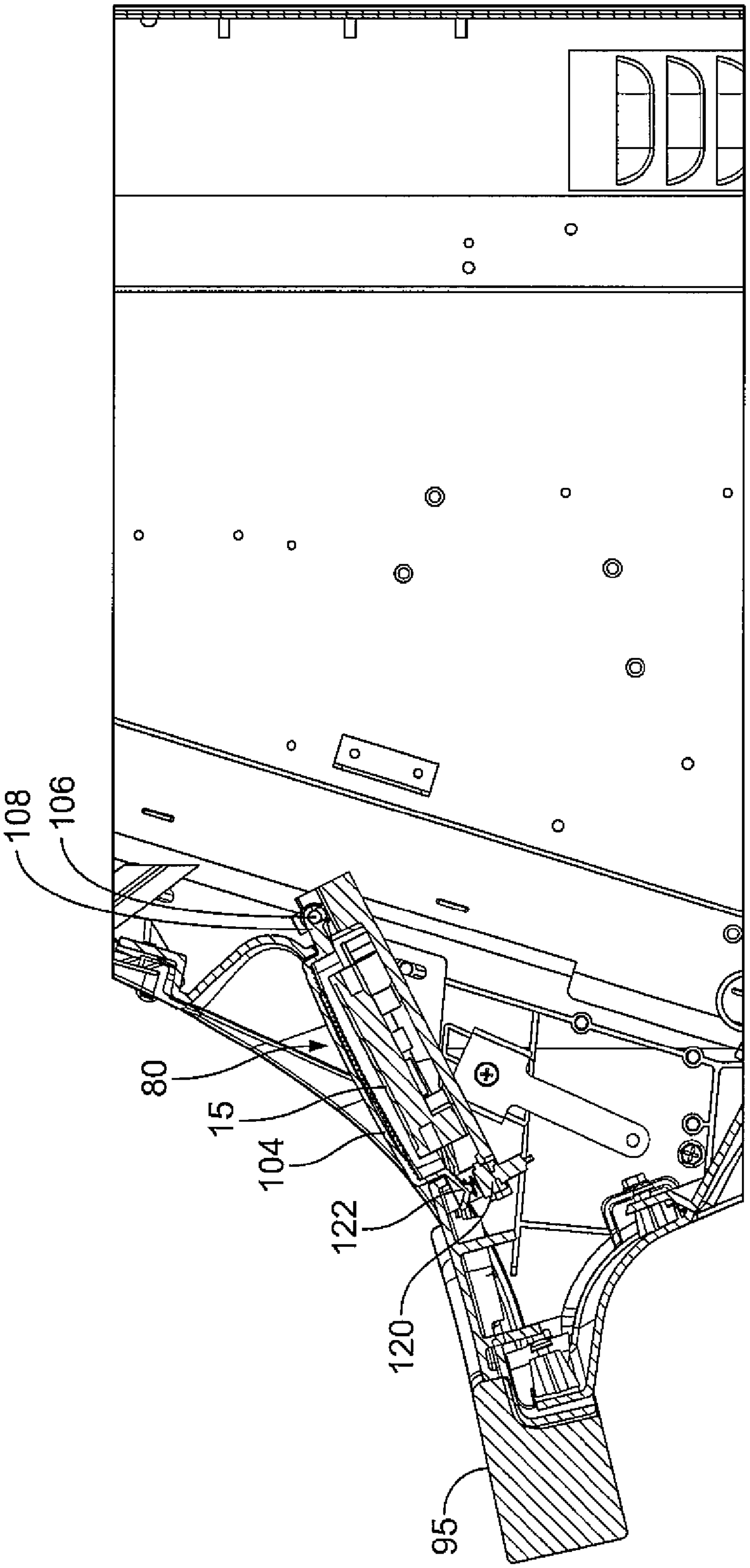
FIG. 4 is a cross-sectional view taken along line 4-4 in FIG. 3.
Figure 5:
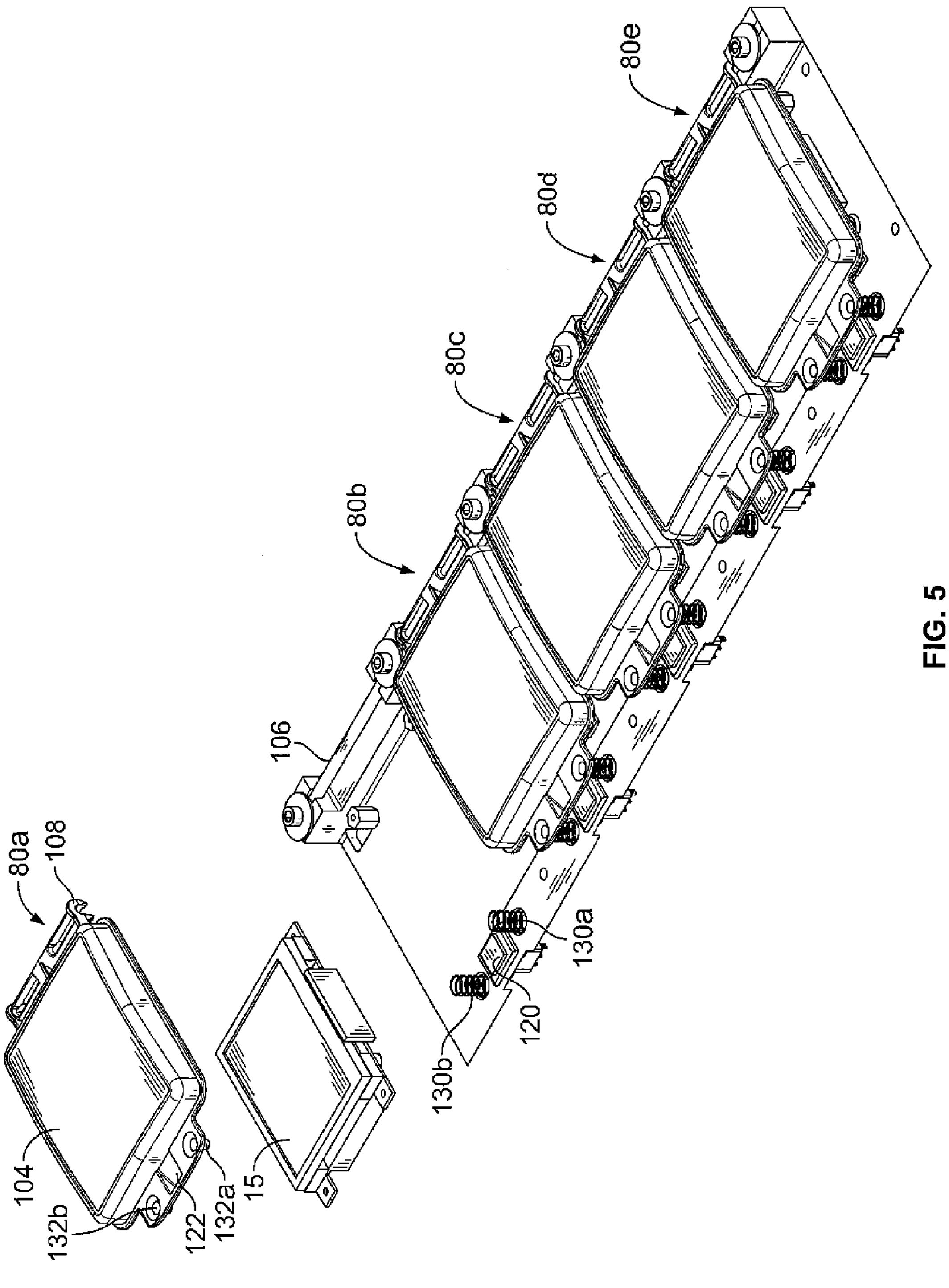
FIG. 5 is a perspective view of a button panel assembly used in the video poker terminal, as well as an exploded view of one of the five buttons.

Referring now to FIGS. 4 and 5, each card button 80 includes a cover 104 and the associated variable display 15. The cover 104 is preferably a transparent plastic cover that provides for a clear view of the underlying variable display 15. The cover 104 is fixed at one end to a pivotable structure 106 by a hinge portion 108 at its top end. As such, when actuated by a player, the cover 104 undergoes a rotational movement around the axis defined by the pivotable structure 106. Due to this rotational movement, the bottom end of the cover 104 that is opposite the hinge portion 108 of the cover 104 is displaced the most. While the cover 104 undergoes rotational movement, the variable display 15 remains in a fixed position below the cover 104 as it is fixed to a structure below the cover 104.

A switch 120 is located adjacent to the bottom end of the cover 104. An actuator 122 is positioned on the bottom end of the cover 104 so as to engage the switch 120 in response to a player's inputs. As indicated in FIG. 2, the controller 42 generally receives inputs from the player input devices 26. Thus, the switch 120 of each card button 80 is coupled to the controller 42. Alternatively, a separate controller can be allocated to the button assemblies and can communicate with high-level signals to the main controller 42.

To urge the cover 104 in an upward direction that is opposite of its rotational movement when actuated by a player, a pair of springs 130 is provided. The fixed ends of two springs 130*a* and 130*b* are mounted on a fixed structure adjacent to the switch 120. Each of the springs 130*a* and 130*b* has a moveable end that engages corresponding pin structures 132*a* and 132*b* on the cover 104. Accordingly, after a player has pushed downwardly on the card button 80 to create a player input, the springs 130 force the cover 104 upwardly back to its normal position. Although the illustrated embodiment utilizes the coil springs 130, leaf springs or other resilient materials, such as rubber or foam cushions, can be used to perform the same biasing function.

The variable displays 15 can include various display technologies, such as OLEDs, LCDs, and plasma displays, and are preferably capable of displaying at least the colors commonly found in a deck of physical playing cards (e.g., black, red, white, blue, yellow). In the illustrated embodiment, each of the variable displays 15 is approximately 2.8 inches in height and 2.2 inches in width. The overall dimensions of the raised portion of the cover 104 that shields the variable display 15 are approximately 3.8 inches in height by 3.1 inches in width. Accordingly, the video representations of the cards in the card buttons 80 can have the same aspect ratio and be approximately the same size as physical playing cards (e.g., about 2.25 to 2.5 inches in width and 3.5 inches in height). Of course, other dimensions for the variable displays 15 and the cover 104 will work as well. The generally transparent cover 104 may include an opaque material, layer, or material-altering process (e.g., optical faceting) around its periphery to hide any unsightly electronics associated with the variable display 15. The optical faceting can also serve to integrate and suitably distribute and diffuse peripheral lighting via red-green-blue LEDs located within the card button 80 near the peripheries of the variable displays 15. The peripheral lighting by the LEDs can serve to accentuate the poker "hold" function, which is described below. In addition, peripheral lighting can be activated during the game "attract" mode and during various game events to enhance celebrations and build anticipation.

Optical faceting can be Fresnel facets, diamond stipple, or pillow patterns. In one preferred embodiment, the optical faceting on the cover 104 includes diamond stipple faceting on the interior with an opaque metallic exterior finish on the border of the cover 104 to aid in the hiding of unsightly electronic elements adjacent to the periphery of the variable displays.

It should be noted that FIG. 4 illustrates another unique feature of the present invention in that the housing 12 is recessed inwardly above the top end of the card buttons 80 near the pivotable structure 106. The recess or alcove in the housing 12 allows the card buttons 80 to be moved inwardly toward the center of the housing 12, thereby creating more space for use at the front of the gaming terminal 10 (i.e., more space in the regions of the armrest 95, the card buttons 80, and the buttons 90). However, the player is still able to view the entire card button 80. Additionally, considering that the player will be actuating the bottom portion of each card button 80 that is opposite of the pivotable structure 106 at the top end, there is less of a need to provide clearance for the player's hand near the top portion of the card buttons 80.

Figure 6A:
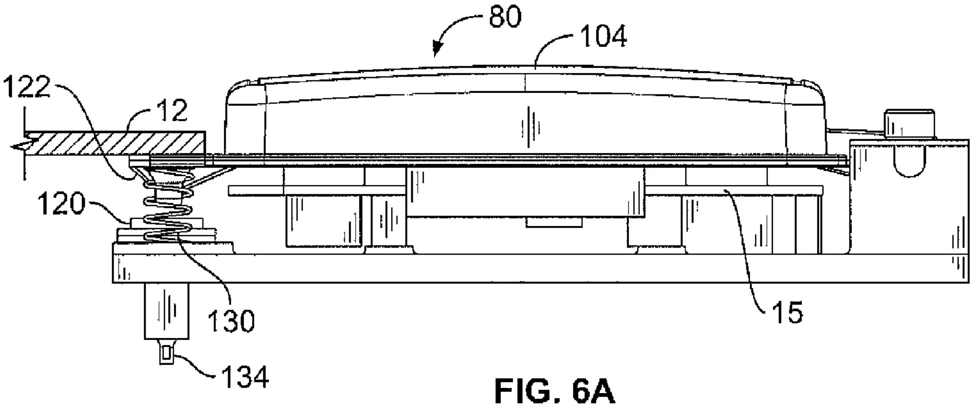
FIGS. 6*a* and 6*b* illustrate, respectively, a button in the normal position and the button in the actuated position.
Figure 6B:
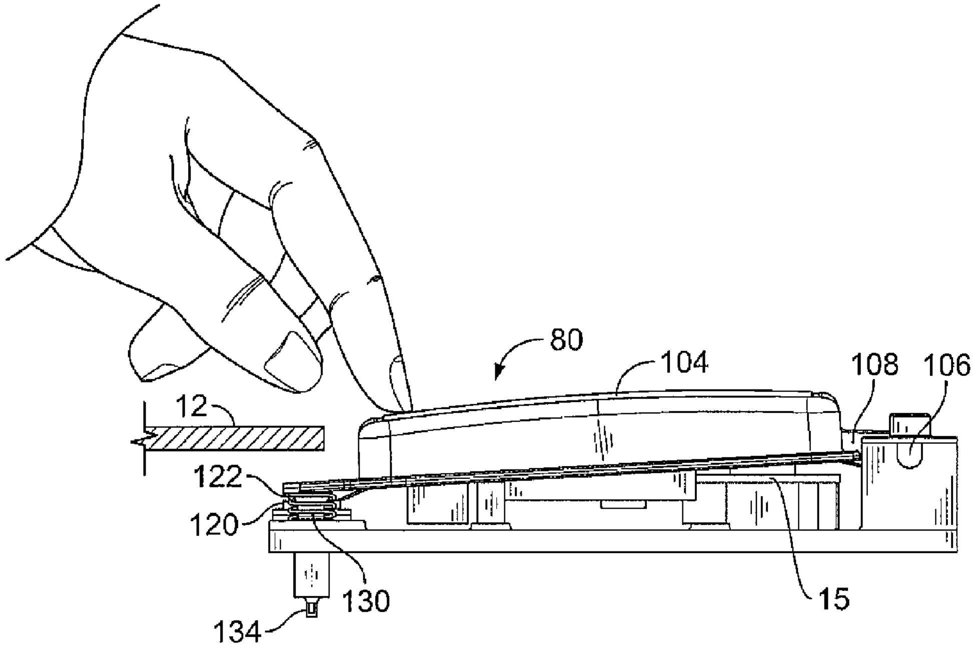

FIGS. 6*a* and 6*b* illustrate, respectively, a card button 80 in the normal position and the button in the actuated position. As shown in FIG. 6*a*, the springs 130 serve to force the cover 104 upwardly against a portion of the housing 12 in the normal position. When actuated, as shown in FIG. 6B, the downward force of the player's finger causes the springs 130 to compress until the actuator 122 on the bottom end of the cover 104 contacts the switch 120, causing a signal to be sent from one of the terminals 134 associated with the switch 120. The actuation of a card button 80 by the player's finger causes rotational movement around the axis defined by the pivotable structure 106.

Figure 7A:
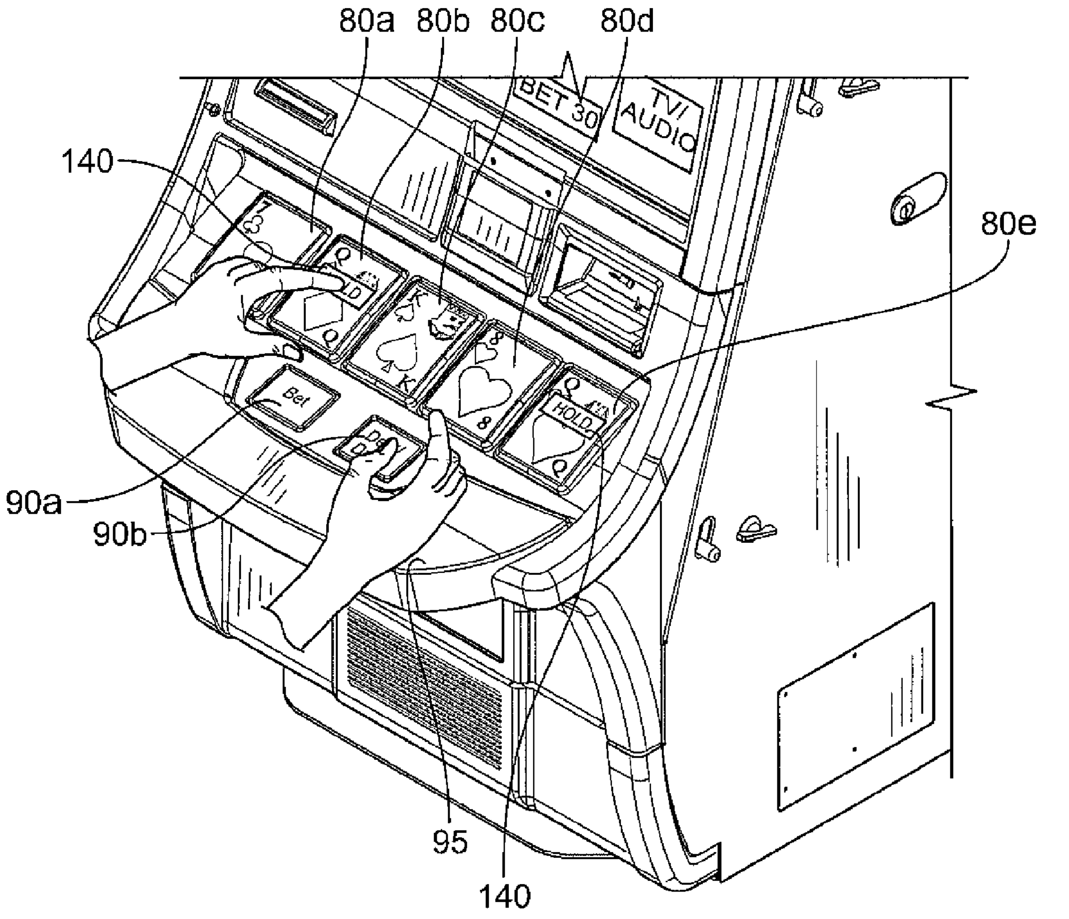
FIGS. 7*a* and 7*b* illustrate the ergonomic positioning of the player's hands relative to the mechanical buttons on the button panel.
Figure 7B:
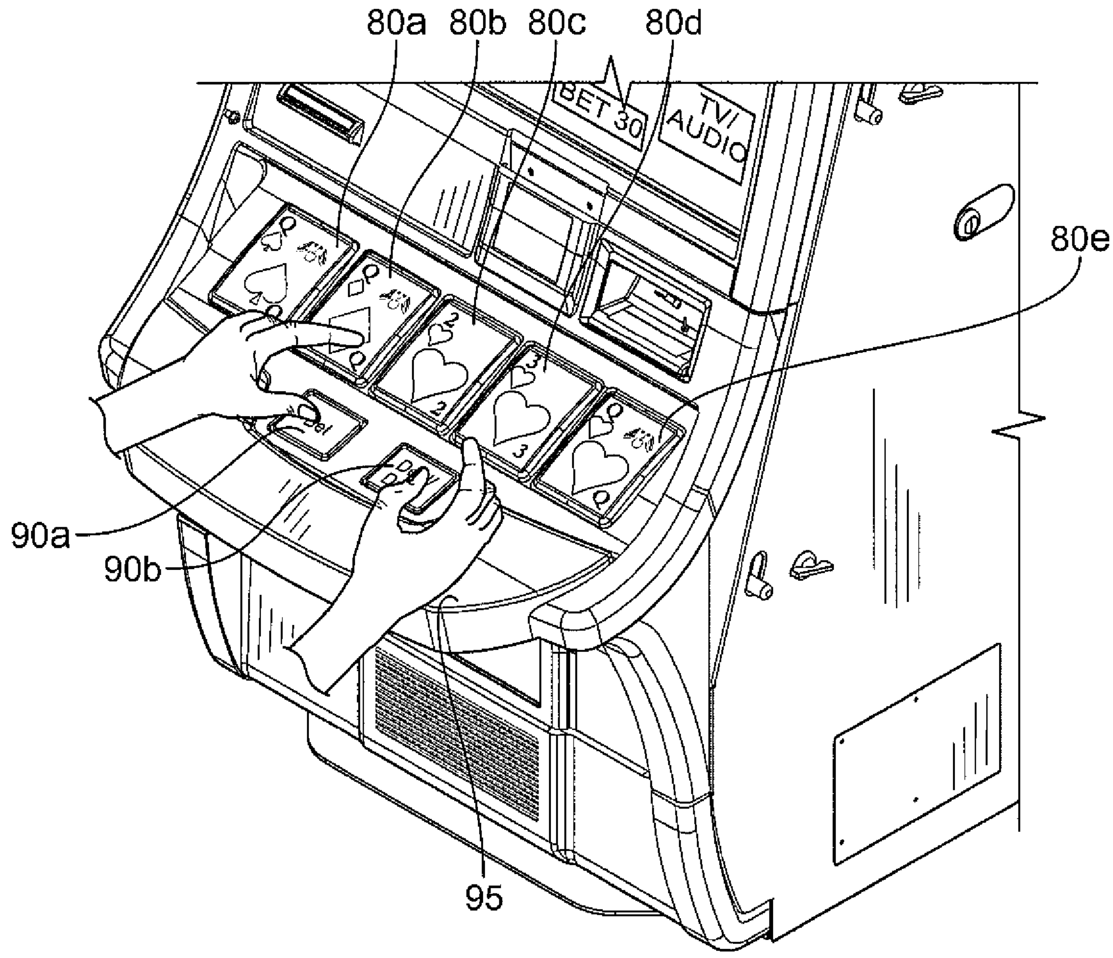

FIGS. 7*a* and 7*b* illustrate an example of a five-card draw poker game displayed on the gaming terminal 10. Initially, the player selects a certain wager amount by using his or her left thumb to provide inputs to the BET button 90*a*. Then, in FIG. 7*a*, after the player has actuated the DEAL/DRAW button 90*b* with his or her right thumb, the player is dealt an initial card hand, which in this case includes a SEVEN, a QUEEN, a KING, an EIGHT, and a QUEEN. This initial card hand is displayed via the variable displays 15 associated with the mechanical card buttons 80*a*-80*e*.

As shown in FIG. 7*a*, the player must then decide if he or she wants to hold or discard each card within the initial card hand. Using his or her fingers on either one or both hands, the player actuates the card buttons 80 to indicate which cards are to be held in the draw poker game. The variable display 15 then displays a "HOLD" indicator 140 such that the player knows which cards in the initial card hand are to be held and which cards are to be discarded. The "HOLD" indicator 140 can also be augmented by internal LED lighting within the card button 80 to assist in instructing the player of the cards being held. Each time a card button 80 is actuated, the state of that card toggles between being held and being discarded. In the illustrated game, the player has used his or her right fingers to actuate the card button 80*e* and his or her left fingers to actuate the card button 80*b*, such that the player is heading into the draw with two QUEEN cards.

Using his or her right thumb, the player actuates the DEAL/DRAW button 90*b* again to cause the SEVEN, KING, and EIGHT cards to be discarded and replaced with three new cards to form a final poker hand. As shown in FIG. 7*b*, the player has been dealt another QUEEN card, a TWO card, and a THREE card in the draw. Thus, the final poker hand includes three QUEEN cards, and the player is provided with a payout corresponding to this winning card hand.

While the button panel arrangements comprising the mechanical buttons 80*a*-80*e* and 90*a*-90*b* are preferably used to play some form of a draw poker game, other poker games and other card games can be played on the gaming terminal 10. For ergonomics, the BET button 90*a* is preferably the left button, while the DEAL/DRAW button 90*b* is preferably the right button. If, however, the buttons 90*a* and 90*b* incorporate variable displays, the functions of these buttons can be easily swapped to accommodate the preferences of a right-handed or left-handed player. Under normal game play, the player's lower arms and wrists are resting on the armrest 95 with the thumbs positioned over the BET button 90*a* and the DEAL/DRAW button 90*b*. Thus, a player can use his or her thumbs to actuate the BET button 90*a* and the DEAL/DRAW button 90*b*, while using her or his fingers to actuate the cards buttons 80*a*-80*e* for purposes of determining which cards to hold and which cards to discard.

Regarding the relative positions of the card buttons 80 and the BET and DEAL/DRAW buttons 90, at least a portion of each of the card buttons 80*a* and 80*b* are to the left of the BET button 90*a*. And, at least a portion of each of card buttons 80*d* and 80*e* are to the right of the deal/draw button 90*a*. Consequently, with only a limited (or no) movement of either thumb from the respective button 90, a player could use one or more fingers on his left hand to touch the two leftmost card buttons 80*a* and 80*b*, one or more fingers on his right hand to touch the two rightmost card buttons 80*d* and 80*e*, and the fingers on either hand to actuate the center card button 80*c*. Considering that the player's fingers will be actuating the bottom portion of the card buttons 80, the rotational movement of the covers 104 of the card buttons 80 around the pivotable structure 106 at the top portion of the card buttons 80 permits the player to actuate each of the card buttons 80 with relatively little downward force. In summary, the relative positions of the card buttons 80 and the BET and DEAL/DRAW buttons 90 and the construction of the pivoting card buttons 80 provide for enhanced comfort and ergonomics to the player.

Figure 8:
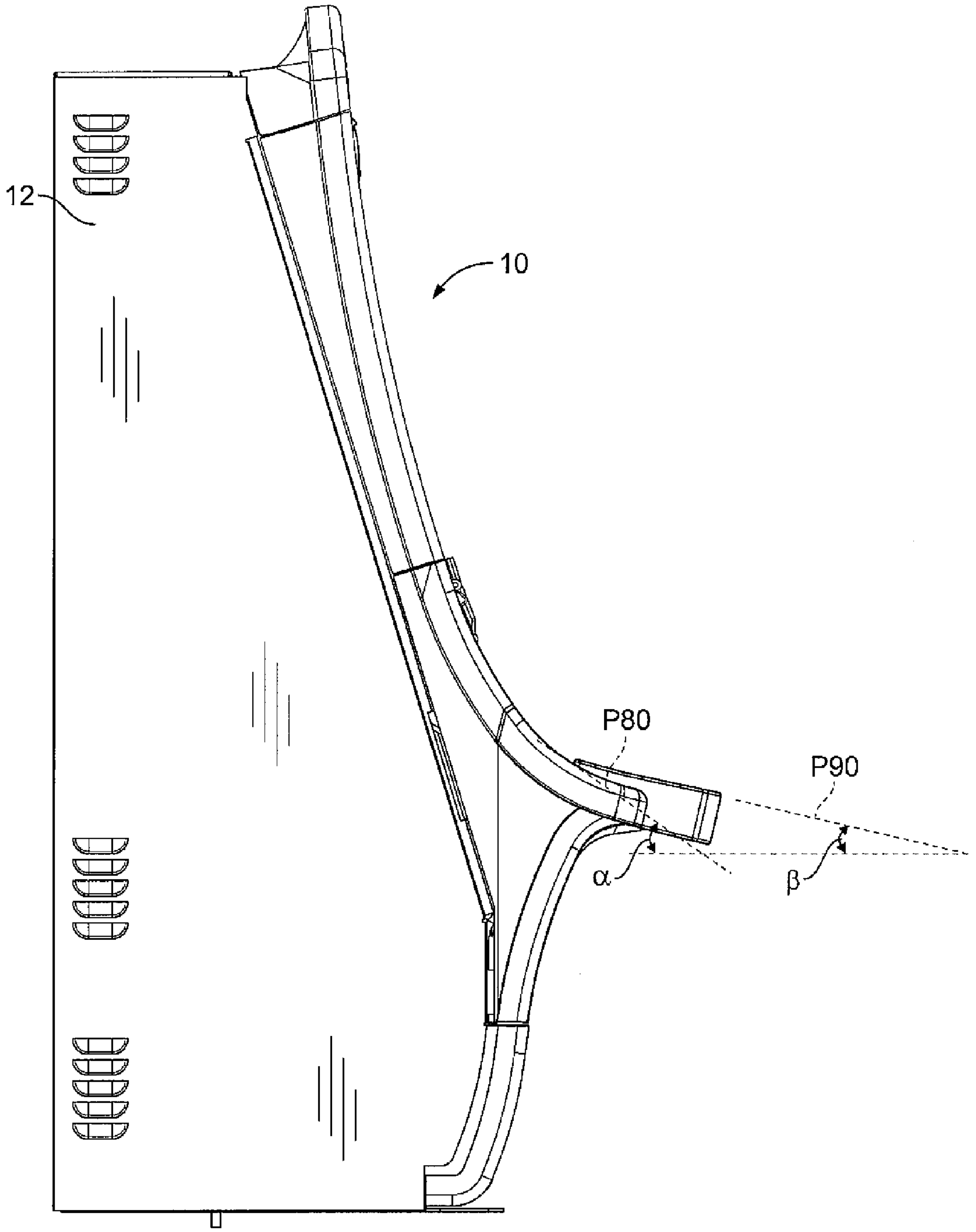
FIG. 8 is a side view of the video poker terminal that illustrates the relative angles of the two sets of mechanical buttons.

Additionally, as shown in FIG. 8, the card buttons 80 are positioned at a different angle relative to the horizontal plane as the BET and DEAL/DRAW buttons 90. In particular, the card buttons 80 are located along a plane P80 that intersects the horizontal plane at an angle $\alpha$, while the BET and DEAL/DRAW buttons 90 are located along a plane P90 that intersects the horizontal plane at an angle $\beta$. Preferably, the angle $\alpha$ is in the range of approximately 10° to 45°, while the angle $\beta$ is less than the angle $\alpha$. The angle $\alpha$ is selected to balance the ergonomics for touching the poker card buttons 80 and the player's ability to view the information (e.g., card indicia, hold indicia) on the variable displays 15 within the card buttons 80. From the standpoint of ergonomically actuating the buttons 80, a smaller angle $\alpha$ that is closer to the horizontal can be helpful, while the viewability may weigh in favor of a greater angle $\alpha$. It should be appreciated the relative height locations of the buttons 80 within the housing 12 also plays a part in this analysis. In the illustrated embodiment, the angle $\alpha$ is chosen to be approximately 25° to balance these competing factors, but an angle $\alpha$ as small as 10° and as large as 45° would still work adequately from the standpoints of both ergonomics and viewability. Regarding angle $\beta$, it can be a very small angle, such as 10° or even 0°.

Because the poker game is conducted using the variable displays 15 located within the card buttons 80, the primary display 14 can be used for many other functions. In particular, the player can choose from various forms of entertainment (e.g., TV shows, sporting events, music videos, etc.) to be displayed on the primary display 14. Alternatively, or in addition, the casino operator can provide various forms of advertisement to the player. If a player tracking card is used in the gaming terminal 10, and the identity of the player is known, the advertisement to the player can be tailored to match the expected needs and desires of that player. Of course, the primary display 14 can also be used to conduct aspects of the poker game itself, such as displaying the wager amount, the total number of credits available to the player, the pay table, thematic artwork, bonus features, progressive jackpot meters, etc. Furthermore, when a winning poker hand is achieved, various celebratory graphics and animations can be displayed on the primary display 14 including an animated display of the winning poker hand along with its payout. In summary, because the poker hands are displayed within the poker buttons 80 while the poker game is being conducted, the primary display 14 can be utilized for numerous functions related to or unrelated to the poker game.

Each of these embodiments and obvious variations thereof is contemplated as falling within the spirit and scope of the claimed invention, which is set forth in the following claims.

What is claimed is:

1. A video poker terminal for conducting a poker game, comprising:

a housing having a horizontal plane that is generally parallel to a floor on which the video poker terminal resides;

a first plurality of mechanical buttons generally located on a plane that intersects the horizontal plane at a first angle $\alpha$ that is in a range from approximately 10° to 45°, each button producing an output signal in response to a predetermined movement of the button, each button including a variable display for displaying a card, the cards forming a poker hand; and a second plurality of mechanical buttons located below the first plurality of mechanical buttons, each of the second plurality of mechanical buttons is located on a plane that intersects the horizontal plane at a second angle $\beta$ that is less than the first angle $\alpha$, the second plurality of mechanical buttons including a wager button and a card-dealing button, the second plurality of mechanical buttons for producing at least a wager output signal and a card-dealing output signal in response to a predetermined movement of the wager button and the card-dealing button, respectively.

2. The poker terminal of claim 1, further including a controller within the housing for initiating a function in response to receiving the output signals of the first plurality of mechanical buttons, the controller for initiating functions in response to receiving the wager output signal and the card-dealing output signal of the second plurality of mechanical buttons.

3. The poker terminal of claim 1, wherein the poker game is a draw poker game, the card-dealing button includes a function for initially dealing the cards and a function for drawing cards during the draw poker game.

4. The poker terminal of claim 1, wherein the first angle $\alpha$ is approximately 25°.

5. The poker terminal of claim 1, wherein the second angle $\beta$ is approximately 0°.

6. The poker terminal of claim 1, further including a primary display located above the first plurality of mechanical buttons, the primary display for displaying a pay table including a plurality of poker hands and their associated payoffs, the primary display not displaying the cards comprising the poker hand while the video poker game is being conducted.

7. The poker terminal of claim 6, wherein, after the outcome of the video poker game is displayed on the variable displays within the first plurality of mechanical buttons, the primary display displays an animation of the cards from the poker hand along with the associated payout.

8. The poker terminal of claim 1, wherein the second plurality of mechanical buttons are located at a middle portion of the housing and further including an armrest partially encompassing the second plurality of mechanical buttons.

9. The poker terminal of claim 1, wherein the first plurality of mechanical buttons include a pivotable axis generally located at top ends of the first plurality of mechanical buttons that are opposite the second plurality of mechanical buttons, the predetermined movement of each of the first plurality of mechanical buttons being rotational around the pivotable axis.

10. The poker terminal of claim 9, wherein the predetermined movement of each of the first plurality of mechanical buttons causes the associated card to be held during a draw of the poker game.

11. The poker terminal of claim 9, wherein each mechanical button includes a cover that covers the variable display, the variable display remaining stationary during the rotational movement of the cover of the mechanical button.

12. The poker terminal of claim 11, wherein the cover includes an actuator, the actuator contacting an associated switch in response to the rotational movement of the cover of the mechanical button and wherein the actuator is located at a bottom end of the cover that is opposite the pivotable axis, each of the mechanical buttons including a biasing mechanism adjacent to the actuator for resisting the rotational movement.

13. The poker terminal of claim 1, wherein at least portions of the two leftmost one of the first plurality of mechanical buttons are located to the left of a leftmost one of the second plurality of mechanical buttons, and at least portions of the two rightmost ones of the first plurality of mechanical buttons are located to the right of a rightmost one of the second plurality of mechanical buttons.

14. A method for conducting a draw poker game on a gaming terminal having a first plurality of mechanical buttons and a second plurality of mechanical buttons, the second plurality of buttons being proximal to the player's hands and the first plurality of buttons being distal to the player's hands, the method comprising:

actuating one of the second plurality of buttons with a thumb on a first one of the player's hands to determine a wager amount for the draw poker game;

displaying each card in the initial card hand on an individual variable display located within a respective one of the first plurality of mechanical buttons, each of the first plurality of mechanical buttons having length and width dimensions comparable to the length and width dimensions of physical playing cards;

receiving, from the first plurality of mechanical buttons, player inputs for determining the cards to be held and the cards to be discarded from the initial card hand, the first plurality of mechanical buttons being actuated by the player's fingers;

actuating another one of the second plurality of buttons with a thumb on a second one of the player's hands to deal the replacement cards for the discarded cards from the initial card hand, the replacement cards and the held cards defining a final card hand;

providing an award if one of a predetermined set of winning poker hands is achieved in the final card hand; and wherein the gaming terminal has a horizontal plane generally parallel to the floor on which the gaming terminal resides, the first plurality of mechanical buttons being located on a plane that intersects the horizontal plane at a first angle α that is in a range from approximately 10° to 45°, each of the second plurality of mechanical buttons is located on a plane that intersects the horizontal plane at a second angle β that is less than the first angle α.

15. The method of claim 14, wherein the first plurality of mechanical buttons include five mechanical buttons, the variable display in each one of the five mechanical buttons being selected from a group consisting of an OLED, an LCD, and a plasma display.

16. The method of claim 14, wherein the displaying each card in the initial card hand occurs in response to the player's thumb on the second one of the player's hands actuating the another one of the buttons in the second plurality of buttons.

17. A method for conducting a draw poker game on a gaming terminal having a first plurality of mechanical buttons and a second plurality of mechanical buttons, the second plurality of buttons being proximal to the player's hands and the first plurality of buttons being distal to the player's hands, the method comprising:

actuating one of the second plurality of buttons with a thumb on a first one of the player's hands to determine a wager amount for the draw poker game;

displaying each card in the initial card hand on an individual variable display located within a respective one of the first plurality of mechanical buttons, each of the first plurality of mechanical buttons having length and width dimensions comparable to the length and width dimensions of physical playing cards;

receiving, from the first plurality of mechanical buttons, player inputs for determining the cards to be held and the cards to be discarded from the initial card hand, the first plurality of mechanical buttons being actuated by the player's fingers;

actuating another one of the second plurality of buttons with a thumb on a second one of the player's hands to deal the replacement cards for the discarded cards from the initial card hand, the replacement cards and the held cards defining a final card hand;

providing an award if one of a predetermined set of winning poker hands is achieved in the final card hand; and wherein each of the first plurality of mechanical buttons has a pivotable axis at a top end that is opposite from the second plurality of mechanical buttons, the player inputs causing the first plurality of mechanical buttons to pivot downwardly around the pivotable axis.

18. The method of claim 14, further including a primary display located above the first plurality of mechanical buttons, the primary display for displaying a pay table including a plurality of poker hands and their associated payoffs, the primary display not displaying the cards comprising the initial card hand or the final card hand prior to the awarding.

19. A video gaming terminal for conducting a card game, comprising:

a housing having a horizontal plane that is generally parallel to a floor on which the video poker terminal resides;

a first plurality of mechanical buttons generally located on a plane that intersects the horizontal plane at a first angle α that is in a range from approximately 10° to 45°, each button producing an output signal in response to a predetermined movement of the button, each button including a variable display for displaying a playing card, the cards forming a card hand, each button having length and width dimensions comparable to the length and width dimensions of physical playing cards; and a second plurality of mechanical buttons located below the first plurality of mechanical buttons, each of the second plurality of mechanical buttons is located on a plane that intersects the horizontal plane at a second angle β that is less than the first angle α, the second plurality of mechanical buttons including a wager button and a card-dealing button, the second plurality of mechanical buttons for producing at least a wager output signal and a card-dealing output signal in response to a predetermined movement of the wager button and the card-dealing button, respectively.

* * * * *